(12) United States Patent
Fujioka

(10) Patent No.: US 7,706,032 B2
(45) Date of Patent: Apr. 27, 2010

(54) SCANNER DEVICE AND IMAGE FORMING APPARATUS

(75) Inventor: Tetsuya Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1362 days.

(21) Appl. No.: 11/124,269

(22) Filed: May 9, 2005

(65) Prior Publication Data

US 2005/0248816 A1 Nov. 10, 2005

(30) Foreign Application Priority Data

May 7, 2004 (JP) ............... 2004-138545

(51) Int. Cl.
 H04N 1/46 (2006.01)
 H04N 1/04 (2006.01)
 G02B 7/02 (2006.01)
 B24B 41/06 (2006.01)
(52) U.S. Cl. ............... 358/509; 358/475; 359/819; 451/390
(58) Field of Classification Search ............... None
See application file for complete search history.

(56) References Cited

U.S. PATENT DOCUMENTS 5,257,138 A * 10/1993 Yamaguchi et al. ......... 359/819
5,505,654 A * 4/1996 Wood et al. ............... 451/6
5,751,446 A 5/1998 Fujioka
6,836,633 B2 12/2004 Bannai et al.

FOREIGN PATENT DOCUMENTS

JP 8-31940 3/1996

* cited by examiner

Primary Examiner—Mark K Zimmerman
Assistant Examiner—Mesfin Getaneh
(74) Attorney, Agent, or Firm—Oblon, Spivak, McClelland, Maier & Neustadt, L.L.P.

(57) ABSTRACT

A scanner device and an image forming apparatus, each having a shading correction unit are disclosed. The shading correction unit is implemented by a lens block, including a fixer and a wall. The fixer fixes a position of the lens block. The wall, connected to the fixer at a connecting point, has an opening. The minimum distance between the circumference line of the opening and the connecting point is larger than a thickness of the wall.

15 Claims, 4 Drawing Sheets

SCANNER DEVICE AND IMAGE FORMING APPARATUS

BACKGROUND OF THE INVENTION

1. Field of the Invention

The present invention generally relates to shading correction, and more particularly to shading correction used in a scanner device or an image forming apparatus.

2. Discussion of the Background

The quality of a scanned image is affected by a number of factors. In one example of such a factor, a lens is incorporated in a scanner device to project light reflected by an original document onto an image sensor, such as a charged coupled device (CCD). However, due to vignetting of the lens, light transmitted through the center portion of the lens is of higher intensity than light transmitted through the edges of the lens. As a result, the corners of the scanned image appear to be darker than the central portion of the image. In another example of such a factor, non-uniform illumination of a light source, which is incorporated in a scanner device, may cause variations in brightness of the scanned image.

In order to improve the quality of the scanned image, a scanner device is usually provided with a shading correction unit, capable of applying shading correction to light reflected from an original document.

FIG. 1 illustrates a lens block 100, which is incorporated in a background scanner device. The lens block 100 is provided with a mask 102, which is defined by the circumference line of a bone-shaped opening made at a central portion of the lens block 100. The lens block 100 is fixed on a lens block stay (not shown) via a fixer 101, which is a side edge portion of the lens block 100.

The mask 102 includes two shading portions 102a facing each other, and two connecting portions 102b facing each other. The shading portions 102a partly cover a central light flux 103. The connecting portions 102b connect the shading portions 102a, without covering any portion of side light fluxes 104 and 105. With this configuration, as shown in FIG. 1, the mask 102 can function as a shading correction unit.

However, the shape of the mask 102 creates another problem. As shown in FIG. 1, the distance D1, which is a minimum distance between the connecting portion 102b and the fixer 101, is reduced. This causes the lens block 100 to easily oscillate. This further causes the problem of pixel shifting or color shifting, especially when the size of the lens block 100 is relatively small.

SUMMARY OF THE INVENTION

An exemplary embodiment of the present invention provides a lens block that includes a fixer and a wall. The fixer fixes the position of the lens block. The wall is connected to the fixer at a connecting point, and has an opening. The minimum distance between the circumference line of the opening and the connecting point is larger than a thickness of the wall.

An exemplary embodiment of the present invention provides a scanner device that includes a light source, an imaging sensor, a lens positioned between the light source and the imaging sensor, a fixer, and a lens block positioned between the light source and the lens. The light source generates a reflected light reflected from an original document, and the imaging sensor converts the reflected light to an electric signal. The lens focuses the reflected light onto the imaging sensor, and the fixer fixes a position of the lens in the scanner device. The lens block wall is provided with a mask. The minimum distance between the mask and the fixer is made larger than a thickness of the lens block wall.

In addition to the above-described exemplary embodiments, this patent specification may be implemented in many other specific forms, as will be apparent to those skilled in the art, without departing from the spirit or scope of the appended claims and the following disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
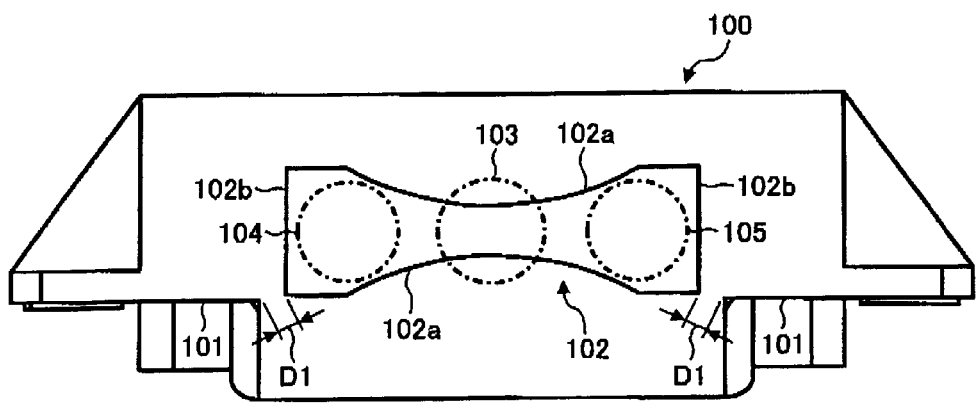
FIG. 1 is a front view illustrating an exemplary structure of a background lens block.

In describing embodiments illustrated in the drawings, specific terminology is employed for clarity. However, the disclosure of this patent specification is not intended to be limited to the specific terminology selected and it is to be understood that each specific element includes all equivalents that operate in a similar manner.

Figure 2:
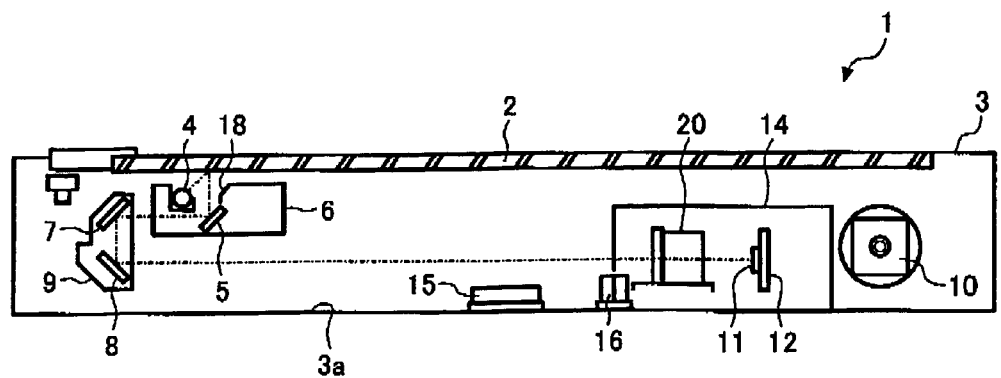
FIG. 2 is a cross-sectional view illustrating a scanner device according to an exemplary embodiment of the present invention.

Referring now to the drawings, wherein like reference numerals designate identical or corresponding parts throughout the several views, FIG. 2 illustrates a scanner device 1 according to an exemplary embodiment of the present invention.

The scanner device 1 includes an exposure glass 2, a housing 3, a lamp 4, a first mirror 5, a first carriage 6, a second mirror 7, a third mirror 8, a second carriage 9, a drive motor 10, a charged coupled device (CCD) 11, a sensor board unit (SBU) 12, a lens block stay 14, a sheet width sensor 15, a sheet length sensor 16, and a lens block 20.

The exposure glass 2 is provided at the upper surface of the housing 3. On the exposure glass 2, an automatic document feeder (ADF) can be provided.

The lamp 4 is implemented by a xenon lamp, which irradiates an image surface of an original document placed onto the exposure glass 2. The lamp 4 can be implemented by any kind of light source. The first mirror 5 is inclined at about forty-five degrees to reflect the light reflected from the image surface of the original document. The lamp 4 and the first mirror 5 are incorporated in the first carriage 6.

The second mirror 7, which is inclined at about forty-five degrees, receives the light reflected from the first mirror 5 and directs it toward the third mirror 8. The third mirror 8, which is inclined at about forty-five degrees, receives the light reflected from the second mirror 7 and directs it towards the CCD 11. The second mirror 7 and the third mirror 8 are incorporated in the second carriage 9.

The first carriage 6 and the second carriage 9 are arranged such that the longitudinal direction of each of the first and second carriages 6 and 9 corresponds to a main scanning direction. The first carriage 6 and the second carriage 9 move in a sub-scanning direction at a speed ratio of two to one.

The drive motor 10 includes a stepping motor, which drives at least one of the first and second carriages 6 and 9 in the sub-scanning direction.

The CCD 11, which is provided on the SBU 12, includes any kind of imaging sensor. In this exemplary embodiment, the CCD 11 is implemented by a three-line color CDD having a plurality of photoelectric conversion elements linearly arranged. The distance between the two adjacent elements is preferably 5 µm, and more preferably 4.7 µm. The elements are arranged in four to eight lines. The distance between the two adjacent lines is preferably 18.8 µm to 37.6 µm. Furthermore, the CCD 11 is provided with a color filter, which is used to read red-green-blue (RGB) color components.

The sheet width sensor 15 detects the width of the original document placed on the exposure glass 2. The sheet length sensor 15 detects the length of the original document placed on the exposure glass 2.

The lens block 20, which is provided on the lens block stay 12, has a mask 22 (see FIG. 3) on its wall surface. The mask 22 performs shading correction on the light received from the third mirror 8 before the light reaches the CCD 11.

Alternatively, the basic structure of the scanner device 1 can be made substantially similar to the basic structure of the scanner device disclosed in the U.S. Pat. No. 6,836,633, patented on Dec. 28, 2004, the entire contents of which are hereby incorporated by reference.

Figure 3:
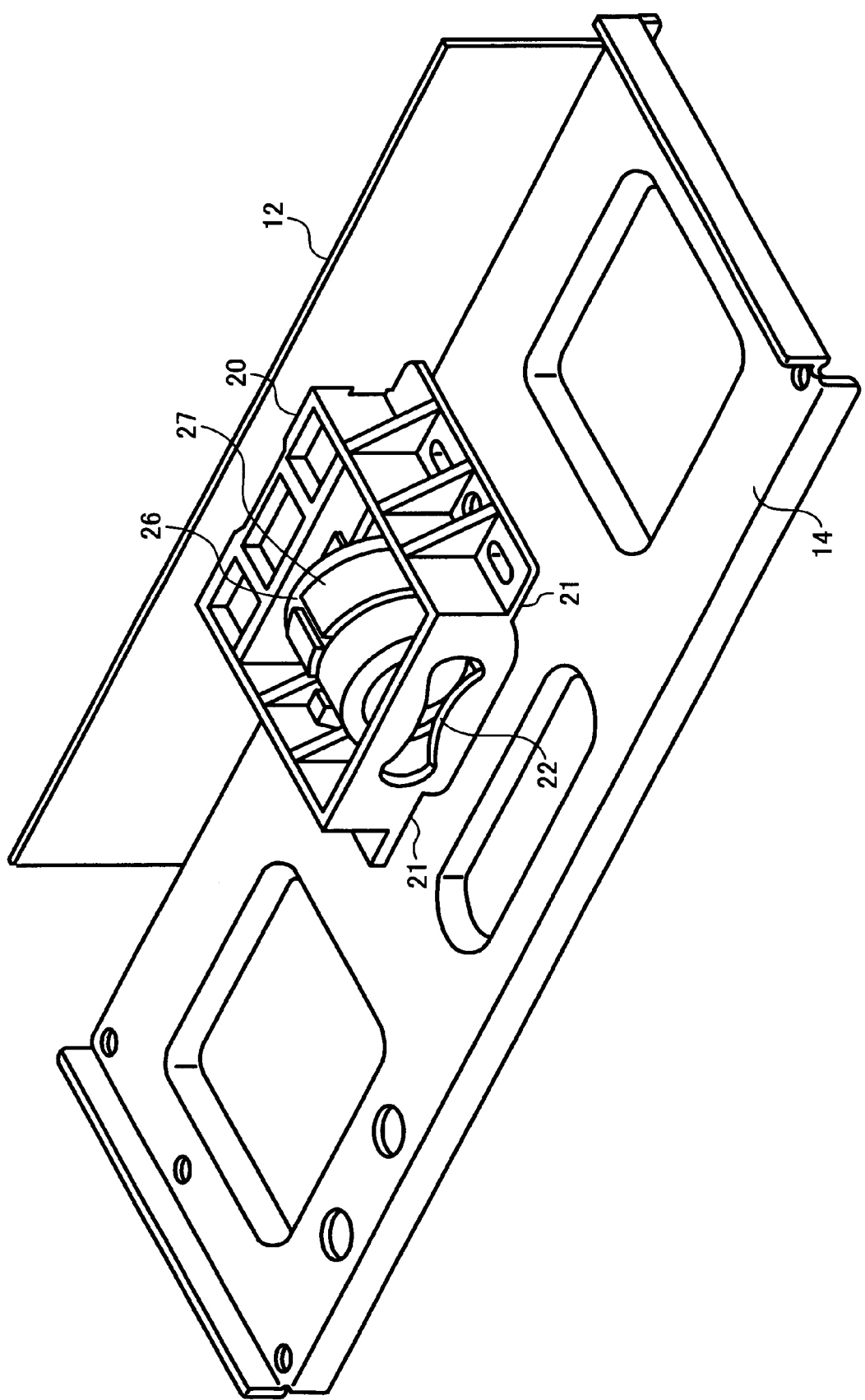
FIG. 3 is a perspective view illustrating an exemplary structure of a lens block shown in FIG. 2.
Figure 5:
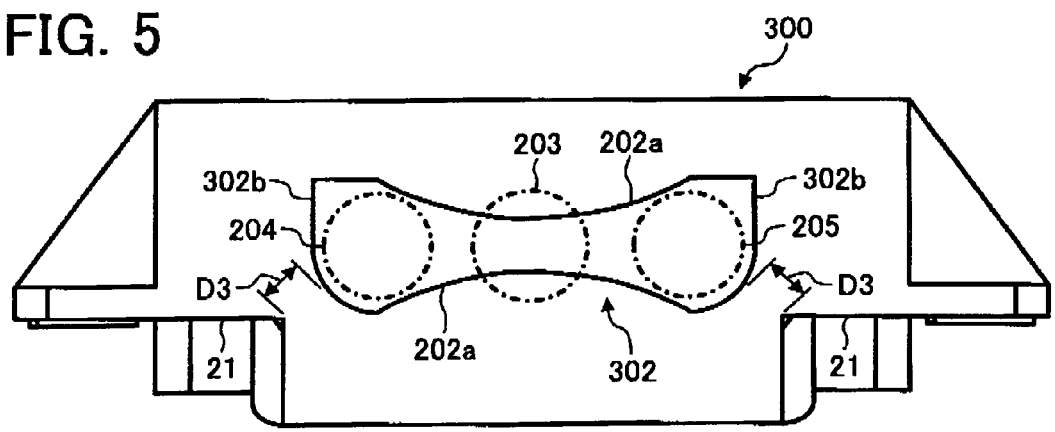
FIG. 5 is a front view illustrating an alternative exemplary structure of a lens block of the present invention.
Figure 6:
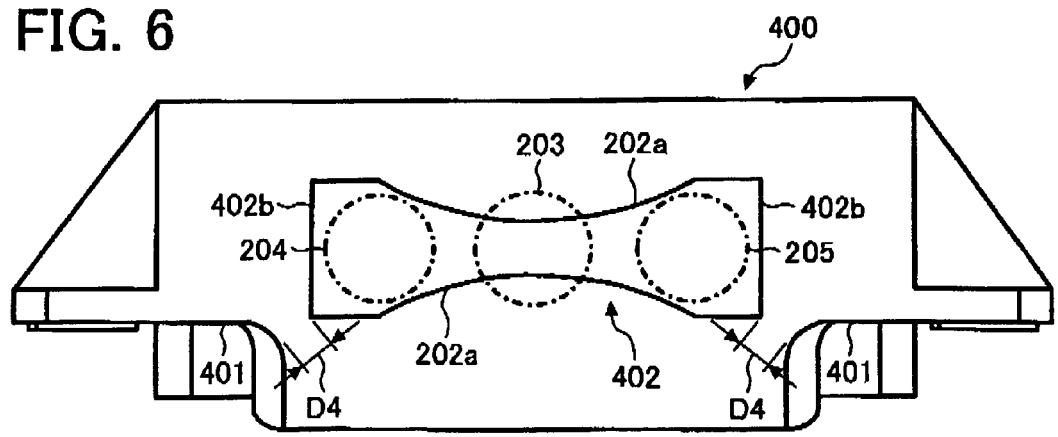
FIG. 6 is a front view illustrating a further alternative exemplary structure of a lens block of the present invention.

As shown in FIG. 3, two opposing sides of the lens block 20 are fixed on the lens stay 14 via fixers 21. One side perpendicular to the two opposing sides of the lens block 20 is fixed on the SBU 12. The remaining one side of the lens block 20 has a mask 22, which functions as a shading correction unit. In this exemplary embodiment, the mask 22 applies shading correction to the reflected light received from the mirror 8 (FIG. 2), having three light fluxes including a central light flux 203, a first side light flux 204, and a second side light flux 205 (which are also illustrated in the embodiments of FIGS. 4, 5, and 6).

The lens 26 is fixed at a position inside the lens block 20 by a lens supporter 27. The lens 26 preferably has a dimension corresponding to the dimension of the CCD 11 (FIG. 2).

Figure 4:
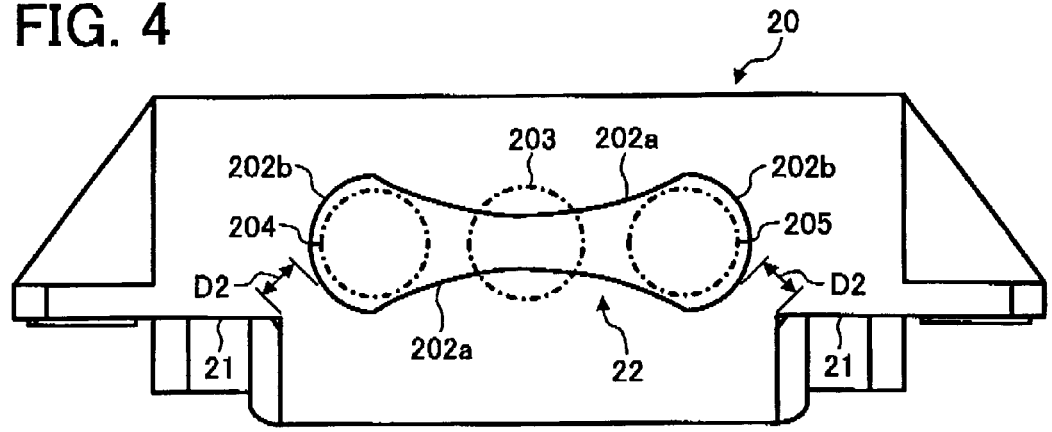
FIG. 4 is a front view illustrating the lens block shown in FIG. 3.

The mask 22 of FIG. 3 is shown in more detail in FIG. 4. The mask can be implemented in various configurations, for example, as illustrated in FIGS. 4, 5 and 6.

The mask 22 of FIG. 4 includes two shading portions 202*a*, and two connecting portions 202*b*. One of the shading portions 202*a* covers an upper portion of the central light flux 203. The other one of the shading portions 202*a* covers a bottom portion of the central light flux 203. The convex curved line of each of the shading portions 202*a* is determined according to various parameters that can affect uniformity of the scanned image, such as a shading profile of the lens 26, for example. Preferably, the shading portions 202*a* are symmetrical to each other at the center of the mask 22. Furthermore, the mask 22 is preferably placed such that the position of its center is matched with the position of the center of the central light flux 203.

One of the connecting portions 202*b* is formed around the circumferential line of the first side light flux 204, without covering any portion of the first side light flux 204. Preferably, the concave curved line of the connecting portion 202*b* is concentric to the circumferential line of the first side light flux 204. The other one of the connecting portions 202*b* is formed around the circumferential line of the second side light flux 205, without covering any portion of the second side light flux 205. Preferably, the concave curved line of the connecting portion 202*b* is concentric to the circumferential line of the second side light flux 205. Preferably, the connecting portions 202*b* are symmetric to each other at the center of the mask 22.

With the structure shown in FIG. 4, the distance D2, which represents the minimum distance between the connecting portion 202*b* and the fixer 21, increases as compared to the configuration depicted in FIG. 1. As a result, the lens block 20 of FIG. 4 is more stable than the lens block depicted in FIG. 1.

The mask 302 of FIG. 5 is substantially similar in structure to the mask 22 of FIG. 4. The differences include the shapes of the connecting portions 302*b*.

In the alternative embodiment depicted in FIG. 5, one of the connecting portions 302*b* is formed around the circumferential line of the first side light flux 204, without covering any portion of the first side light flux 204. As shown in FIG. 5, the upper portion of the connecting portion 302*b* forms an angular shape, while the bottom portion of the connecting portion 302*b* is substantially similar in shape with the connecting portion 202*b* of FIG. 4. The other of the connecting portions 302*b* in the alternative embodiment of FIG. 5 is formed around the circumferential line of the second side light flux 205, without covering any portion of the second side light flux 205. As shown in FIG. 5, the upper portion of the connecting portion 302*b* forms an angular shape, while the bottom portion of the connecting portion 302*b* is substantially similar in shape with the connecting portion 202*b* of FIG. 4.

Preferably, the connecting portions 302*b* are symmetric to each other at the center of the mask 302. Further, the mask 302 is preferably placed such that the position of its center is matched with the position of the center of the central light flux 203.

With the structure shown in FIG. 5, the distance D3, which represents the minimum distance between the connecting portion 302*b* and the fixer 21, increases as compared to the configuration depicted in FIG. 1. As a result, the lens block 300 of FIG. 5 is more stable than the lens block depicted in FIG. 1.

The lens block 400 of FIG. 6 has a mask 402, which is substantially similar in structure to the mask 102 of FIG. 1. The differences include the fixer 401, having a shape different from that of the fixer 21.

The corner of the fixer 401, which includes a location or point having a distance closest to the connecting portion 402*b*, is curved. Preferably, the curved line of the corner is made concentric to the circumferential line of at least one of the first and second side light fluxes 204 and 205.

With the structure shown in FIG. 6, the distance D4, which represents the minimum distance between the connecting portion 402*b* and the fixer 401, increases as compared to the configuration depicted in FIG. 1. As a result, the lens block 400 of FIG. 6 is more stable than the lens block depicted in FIG. 1.

Figure 7:
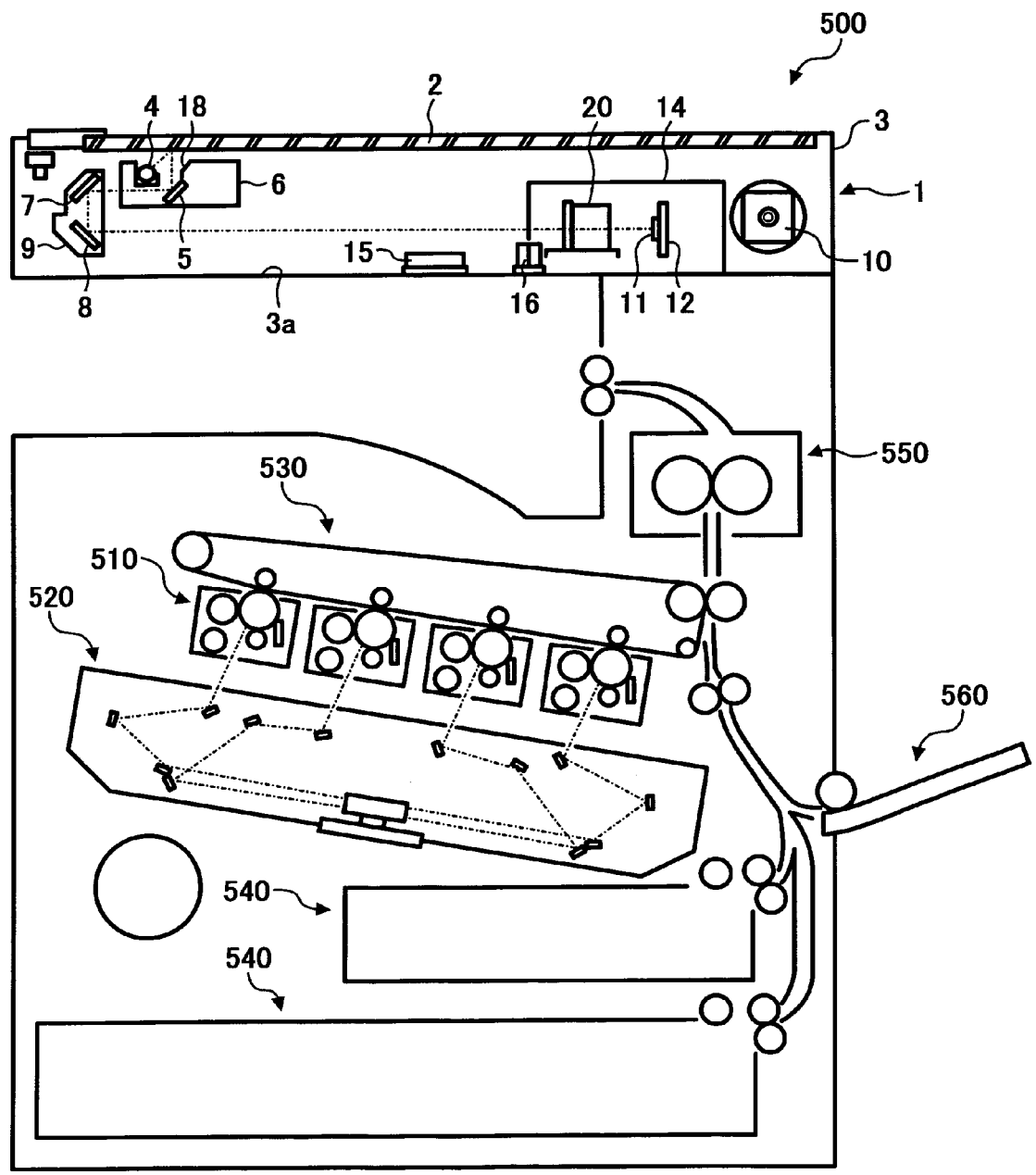
FIG. 7 is a cross-sectional view illustrating an exemplary structure of an image forming apparatus according to the present invention.

The scanner device 1 of FIG. 2 can be combined with any other device, as illustrated in FIG. 7, for example.

Referring to FIG. 7, an image forming apparatus 500 is depicted that includes the scanner device 1, an image forming device 510, an optical device 520, an intermediate transfer device 530, recording medium storage 540, a transfer device 550, and an output tray 560.

In operation, when a user instructs the image forming apparatus 500 to copy an original document placed on the exposure glass 2, the lamp 4 irradiates a light onto the image surface of the original document. The light reflected from the image surface is directed by the first mirror 5 toward the second mirror 7. The light is further directed by the second mirror 7 to the third mirror 8, and toward the lens block 20. Using the mask 22, the lens block 20 applies shading correction to the light. The corrected light passes through the lens 26 to the CCD 11, and the CCD 11 converts the light to an electric signal.

The image forming device 510 forms a latent image based on the electric signal. With the light irradiated from the optical device 520, the latent image is developed into a toner image, and transferred onto a recording medium carried by the intermediate transfer device 530 from the recording medium storage 540. The recording medium having the toner image can be discharged onto the output tray 560. Alternatively, the recording medium can be transferred upward to the transfer device 550 to be discharged onto an ADF provided on the scanner device 1, for example.

Numerous additional modifications and variations are possible in light of the above teachings. It is therefore to be understood that within the scope of the appended claims, the disclosure of this patent specification may be practiced otherwise than as specifically described herein.

For example, the mask 22 of FIG. 4 can be combined with the fixer 401 of FIG. 6. Alternatively, the mask 302 of FIG. 5 can be combined with the fixer 401 of FIG. 6.

Further, the shape of the mask is not limited to the above-described examples, as long as the minimum distance between the connecting portion and the fixer is large enough to suppress the oscillation. To suppress the oscillation, the minimum distance is preferably set to be larger than the wall thickness of the lens block. More preferably, the distance is set to be 1.5 to 2 times larger than the wall thickness of the lens block.

For example, if the lens block is made of resin, the lens block preferably has a wall thickness of 3 mm to 5 mm, and more preferably has a wall thickness of 3 mm. The thickness of the lens block can thus be set to be larger than 3 mm to 10 mm.

In another example, if the lens block is made of plate, such as steel plate, the lens block preferably has a wall thickness of 1 mm to 2 mm, and more preferably has the wall thickness of 1.6 mm. The thickness of the lens block can thus be set to be larger than 1 mm to 4 mm.

This patent specification is based on and claims priority to Japanese patent application No. 2004-138545 filed on May 7, 2004, in the Japanese Patent Office, the entire contents of which are hereby incorporated by reference.

What is claimed is:

1. A scanner device, comprising:
    a light source configured to generate a reflected light reflected from an original document;
    an imaging sensor configured to convert the reflected light to an electric signal;
    a lens placed between the light source and the imaging sensor and configured to focus the reflected light onto the imaging sensor;
    a fixer configured to fix the position of the lens in the scanner device; and
    a lens block wall placed between the light source and the lens and configured to form a mask having a minimum distance from the fixer being larger than a thickness of the lens block wall,
    wherein the minimum distance is 1.5 to 2.0 times larger than the thickness of the lens block wall.

2. The scanner device of claim 1, wherein the mask includes a shading portion and a connecting portion.

3. The scanner device of claim 2, wherein the shading portion has a shape convexed toward a center of the mask.

4. The scanner device of claim 2, wherein the reflected light includes:
    a central light flux configured to pass through a central portion of the lens; and
    a side light flux configured to pass through a portion toward at least one of two sides of the central portion of the lens.

5. The scanner device of claim 4, wherein the shading portion partly covers the central light flux.

6. The scanner device of claim 4, wherein the connecting portion is formed around the circumference of the side light flux.

7. The scanner device of claim 6, wherein at least a bottom half portion of the connecting portion is concentric to the circumference of the side light flux.

8. The scanner device of claim 7, wherein the upper half portion of the connecting portion is concentric to the circumference of the side light flux.

9. The scanner device of claim 7, wherein the upper half portion of the connecting portion has an angular shape.

10. The scanner device of claim 7, wherein the fixer has a curved circumference line around the connecting portion.

11. The scanner device of claim 4, wherein the fixer has a curved circumference line around the connecting portion.

12. The scanner device of claim 11, wherein the curved circumference line is concentric to a circumference of the side light flux.

13. The scanner device of claim 1, wherein the mask has a shape symmetric at a center of the mask.

14. An image forming apparatus, comprising the lens block of claim 1.

15. The scanner device of claim 1, wherein the thickness of the lens block wall is determined based on a material of the lens block wall.

* * * * *